United States Patent
Pekar et al.

(10) Patent No.: US 9,659,364 B2
(45) Date of Patent: May 23, 2017

(54) PROBABILISTIC REFINEMENT OF MODEL-BASED SEGMENTATION

(75) Inventors: Vladimir Pekar, Toronto (CA); Arish A. Qazi, Oakville (CA)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 959 days.

(21) Appl. No.: 13/581,512

(22) PCT Filed: Feb. 14, 2011

(86) PCT No.: PCT/IB2011/050601
§ 371 (c)(1),
(2), (4) Date: Aug. 28, 2012

(87) PCT Pub. No.: WO2011/110960
PCT Pub. Date: Sep. 15, 2011

(65) Prior Publication Data
US 2012/0320055 A1 Dec. 20, 2012

Related U.S. Application Data

(60) Provisional application No. 61/312,725, filed on Mar. 11, 2010.

(51) Int. Cl.
*G06K 9/00* (2006.01)
*G06T 7/00* (2017.01)
*G06T 7/143* (2017.01)

(52) U.S. Cl.
CPC ............ *G06T 7/0012* (2013.01); *G06T 7/143* (2017.01); *G06T 2207/10072* (2013.01); *G06T 2207/20128* (2013.01)

(58) Field of Classification Search
CPC .......... G06K 9/34; G06K 9/38; G06K 9/0014; G06K 9/0042; G06K 9/6267; G06K 9/00436

(Continued)

(56) References Cited

U.S. PATENT DOCUMENTS

2008/0008369 A1* 1/2008 Koptenko et al. ............ 382/128
2009/0080747 A1 3/2009 Lu et al.
(Continued)

FOREIGN PATENT DOCUMENTS

WO 2009118020 A1 10/2009

OTHER PUBLICATIONS

John Ashburner and Karl J. Friston, "Unified segmentation", NeuroImage 26 (2005) 839-851.*

(Continued)

*Primary Examiner* — Weiming He

(57) ABSTRACT

A system for segmenting current diagnostic images includes a workstation (30) which segments a volume of interest in previously generated diagnostic images of a selected volume of interest generated from a plurality of patients. One or more processors (32) are programmed to register the segmented previously generated images and merge the segmented previously generated images into a probability map that depicts a probability that each voxel represents the volume of interest (24) or background (26) and a mean segmentation boundary (40). A segmentation processor (50) registers the probability map with a current diagnostic image (14) to generate a transformed probability map (62). A previously-trained classifier (70) classifies voxels of the diagnostic image with a probability that each voxel depicts the volume of interest or the background. A merge processor (80) merges the probabilities from the classifier and the transformed probability map. A segmentation boundary processor (84) determines the segmentation boundary for the volume of interest based on the current image based on the merge probabilities.

20 Claims, 4 Drawing Sheets

(58) Field of Classification Search
USPC ........ 382/168–172, 190, 224, 256, 283, 294
See application file for complete search history.

(56) References Cited

U.S. PATENT DOCUMENTS

2009/0226060 A1    9/2009  Gering et al.
2010/0080434 A1*   4/2010  Seifert et al. ................ 382/131

OTHER PUBLICATIONS

Brookstein, F. L.; Principal Warps: Thin-Plate Splines and the Decomposition of Deformations; 1989; IEEE Trans. on Pattern Analysis and Machine Intelligence; 23(6)567-585.

Commonwick, O., et al.; Atlas-based delineation of lymph node levels in head and neck computed tomography images; 2008; Radiotherapy and Oncology; 87:281-289.

Cootes, T. F., et al.; Active Appearance Models; 2001; IEEE Trans. on Pattern Analysis and Machine Intelligence; 23(6)681-685.

Kaus, M. R., et al.; Automated 3-D PDM Construction From Segmented Images Using Deformable Models; 2003; IEEE Trans. on Medical Imaging; 22(8)1005-1013.

Ma, Y., et al.; A Three-Dimensional Digital Atlas Database of the Adult C57BL/6J Mouse Brain by Magnetic Resonance Microscopy; 2005; Neuroscience; 135:1203-1215.

Sluimer, I., et al.; Toward Automated Segmentation of the Pathological Lung in CT; 2005; IEEE Trans. on Medical Imaging; 24(8)1025-1038.

Vrooman, H. A., et al.; Multi-spectral brain tissue segmentation using automatically trained k-Nearest-Neighbor classification; 2007; NeuroImage; 37:71-81.

Weese, J., et al.; Shape Constrained Deformable Models for 3D Medical Image Segmentation; 2001; LNCS; 2082:380-387.

Wimmer, A., et al.; Implicit Active Shape Model Employing Boundary Classifier; 2008; IEEE Trans on Pattern Recognition; pp. 1-4.

Artaechevarria, X., et al.; Combination Strategies in Multi-Atlas Image Segmentation: Application to Brain MR Data; 2009; IEEE Trans. on Medical Imaging; 28(8)1266-1277.

Commowick, O., et al.; Atlas-based delineation of lumph node levels in head and neck computed tomography images; 2008; Radiotherapy and Oncology; 87:281-289.

Svarer, C., et al.; MR-based automatic delineation of volumes of interest in human brain PET images using probability maps; 2005; NeuroImage; 24:969-979.

* cited by examiner

PROBABILISTIC REFINEMENT OF MODEL-BASED SEGMENTATION

CROSS REFERENCE TO RELATED APPLICATIONS

This application claims the benefit of U.S. provisional application Ser. No. 61/312,725 filed Mar. 11, 2010, which is incorporated herein by reference.

The present application relates to image segmentation. It finds particular application in conjunction with medical diagnostic imaging for delineating target volumes, organs, and the like.

Various diagnostic imaging modalities, such as CT, MRI, PET, SPECT, and ultrasound, generate three-dimensional images of the internal anatomy of a patient. Different organs, different tissues, cancerous versus non-cancerous tissues, and the like are typically depicted with different gray-scale levels, which gray-scale levels can be mapped to different colors for easier differentiation. Often, adjoining organs, tissue volumes, and the like have little or no significant gray-scale difference. For example, some soft tissue structures may be poorly contrasted in CT data. Such poor or ambiguous contrast makes the corresponding boundary portions only partially visible, i.e., ambiguous and not positively defined.

Model-based segmentation has been used to address this problem. Typically, some regions of the boundary are well-defined and others are not. In the prior model-based segmentation techniques, a library of object models, e.g., specific organ models, was developed. These organ models were typically registered, e.g., rotated, scaled, and the like, to align with the clearly-defined segmented boundaries. Organ models can be generated by averaging accurately manually segmented like objects or organs to develop a nominal model for the object or organ.

One efficient model-based segmentation technique for fitting the model to the boundary includes defining the models as a flexible triangular mesh and adapting the triangular mesh to the boundaries of the object or organ of interest. One technique for fitting the mesh model to the current image data includes mathematically applying opposing forces to the mesh model. Specifically, the technique determines an equilibrium between external energy attracting the mesh to the known image features, such as edges or boundaries in the image, and an opposing shape-preserving internal energy which urges the model to retain its shape.

Unfortunately, imposing constraints on the model shape can be disadvantageous in accurately following the boundary of the structure or organ of interest. Finding the optimal balance between the two energy terms is usually not an easy task and may lead to ambiguous or multiple potential solutions.

The present application describes a refined approach which in many cases achieves more accurate final segmentation results by classifying voxels located in a band around the adapted mesh which represents an area of segmentation uncertainty.

In accordance with one aspect, a system for segmenting current diagnostic images is provided. One or more workstations segment a volume of interest in previously generated high contrast diagnostic images of a selected volume of interest generated from a plurality of other patients. One or more processors are programmed to register the segmented previously generated images and merge the segmented previously generated images into a probability map which depicts the probability that each voxel represents the volume of interest, a probability that each voxel represents background, and a mean segmentation boundary. A segmentation processor registers the probability map with a current diagnostic image of the volume of interest in a current patient to generate a transformed probability map.

In accordance with another aspect, a method of segmenting diagnostic images is provided. A volume of interest in prior diagnostic images of a selected volume of interest generated from a plurality of patients are segmented. The segmented prior images are registered and the registered segmented prior images are merged into a probability map which depicts a probability that each voxel represents the volume of interest, a probability that each voxel represents background, and a mean segmentation boundary.

In accordance with another aspect, a probability map generated by the foregoing method is provided.

In accordance with another aspect, a tangible computer-readable medium carrying one or more computer programs for controlling one or more processors to perform the above-described method is provided.

One advantage resides in facilitating fully automated accurate segmentation.

Another advantage resides in more reliable segmentation results.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
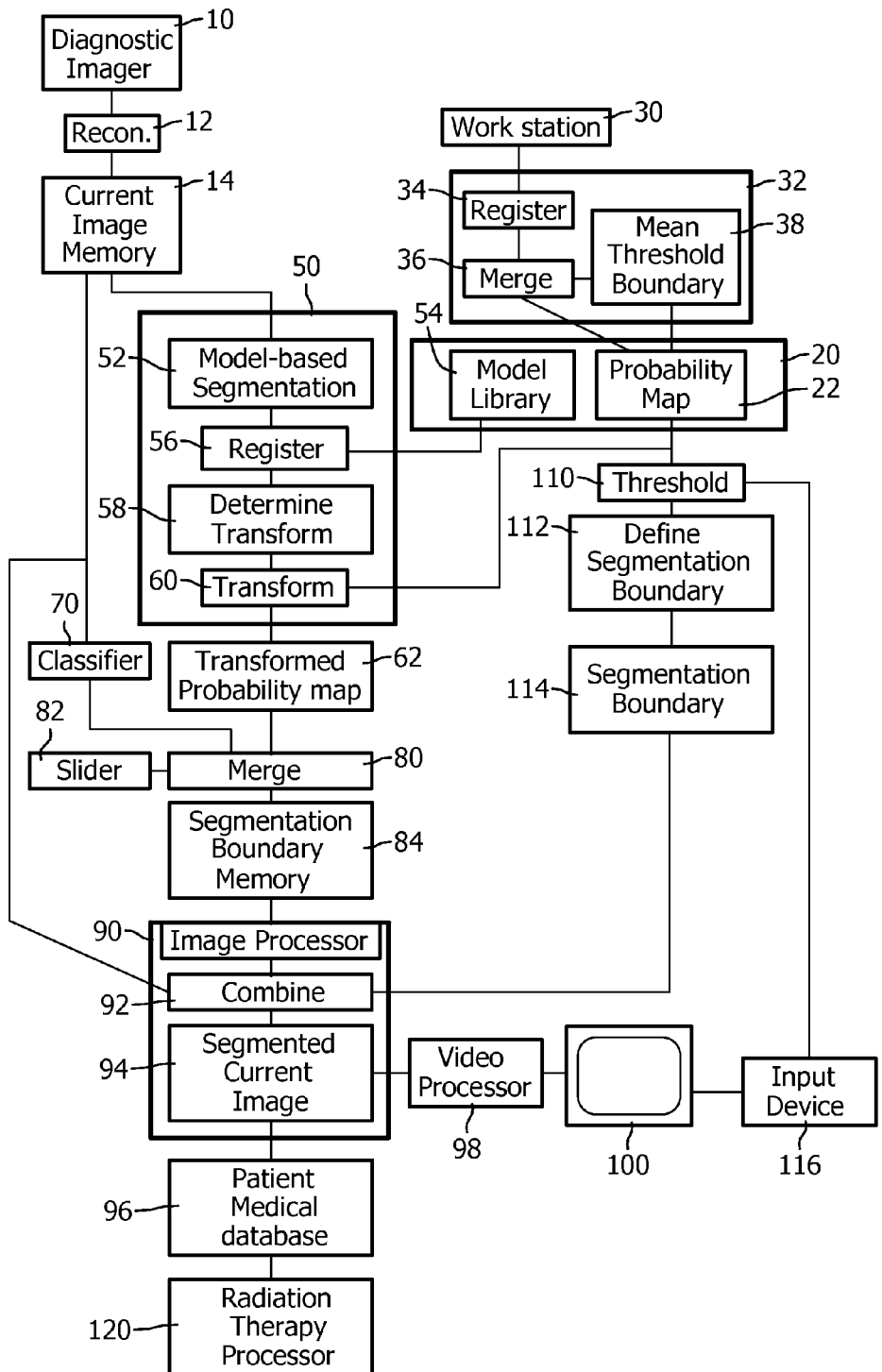
FIG. 1 is a diagrammatic illustration of an apparatus or system for automatically segmenting diagnostic images.

With reference to FIG. 1, a diagnostic imaging scanner 10, such as a CT scanner, MRI scanner, PET scanner, nuclear scanner, an ultrasound scanner or the like, generates image data which is reconstructed by a reconstruction processor 12 to generate a current 3D diagnostic image which is stored in a memory, memory segment, or buffer 14.

Figure 2:
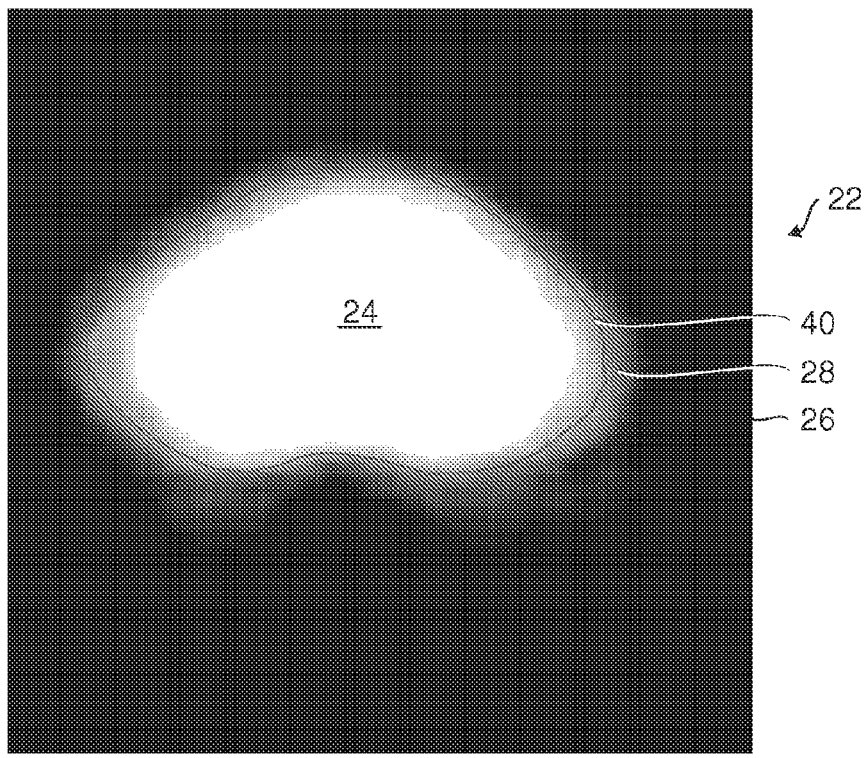
FIG. 2 is a diagrammatic illustration of an axial slice of a probability map of a brain stem model.

With continuing reference to FIG. 1 and further reference to FIG. 2, a memory or memory segment 20 stores a library of 3D probability maps 22. The probability map defines a volume of interest region 24 which is known to be a part of the region or volume of interest, in the present example, the brain stem. A background region 26 defines objects or tissues which are known to be background, i.e., not the brain stem. That is, voxels in brain stem region 24 have a 100% probability of depicting the brain stem and a 0% probability of depicting the background. Conversely, voxels in the background region 26 have a 100% probability of depicting the background and a 0% probability of depicting the brain stem. An uncertainty region 28 lies between the brain stem region 24 and the background region 26. In the uncertainty region, each voxel has a probability between 100% and 0% that it lies in the object or organ of interest, e.g., the brain stem, and a probability between 0% and 100% that it lies in the background.

To generate the probability map 22 for the brain stem or other volume of interest, images with good contrast, i.e., accurately segmentable boundaries, are manually segmented at work station 30 to define binary masks in which all of the voxels which correspond to the volume of interest, e.g., the brain stem, are given the maximum probability value, e.g., one, and all of the voxels which correspond to the background are given a minimum probability value, e.g., zero. The boundary between the minimum and maximum probability regions of the binary mask defines the boundary of the masks, i.e., the segmentation boundary which can be defined by a triangular mesh surface. One or more processors 32 has a binary mask registration computer routine 34 which is programmed to register a plurality of the binary masks and the segmentation boundaries. That is, the binary masks are scaled to adjust for patients or objects of interest of different size, rotated, shifted, and the like, and optionally, elastically deformed to compensate, for example, for images generated in different motion states of the object of interest to bring them into alignment. The one or more processors 32 is also programmed to or has a binary mask merging computer routine 36 which merges the plurality of aligned binary masks. In the present example, background regions which are defined as background by all binary masks are given the probability value of zero, and brain stem regions which are defined by all of the binary masks as being part of the brain stem are assigned a value of one, i.e., assigned to the brain stem region 24. Based on the relative location of the boundaries in the plurality of images, probabilities greater than zero and less than one, are assigned to the other voxels corresponding to the uncertainty region 28. For example, each voxel in the uncertainty region is given the average of its value in the binary maps. If the voxel is background, i.e. a value of zero in one in half the maps and in the brain stem i.e. a value of one in half the maps, the voxel is assigned the average or 0.5. The processor 32 is also programmed to or has a computer routine 38 which determines a median or mean segmentation boundary 40, i.e., a mean or median or other average location of the segmentation boundaries of all of the binary masks. The probabilities for each voxel and the mean segmentation boundary define the segmentation map 22. Typically, this same process is performed for a plurality of organs or volumes of interest to build a library of probability maps that are suitable for numerous different imaging locations or applications.

In one embodiment, a model-based segmentation processor 50 is programmed to include a computer routine 52 which extracts a conventional volume or organ model from a model library 54 and fits it to the volume or organ of interest. The segmentation processor is further programmed to include a computer routine 56 which registers the mean segmentation boundary 40 from the probability model with the conventional model and is programmed to or includes a computer routine 58 which determines a transform that brings the mean segmentation boundary into registration with the registered conventional model. The segmentation processor is also programmed to or has a computer routine 60 which transforms the probability map in accordance with this determined transform to bring the probability map into registration with the volume or organ of interest in the current image. The transformed probability map is stored in a buffer or memory 62. Alternately, rather than using a conventional model for the model-based registration 56, the mean segmentation boundary from the probability map, can be used as the model.

In a fully-automated embodiment, a classifier 70, such as a processor or computer routine, is previously trained to classify voxels of images based on image properties, such as intensity, gradient, texture, etc., as belonging to the volume or organ of interest, as belonging to the background, or a probability thereof. The classifier has been previously trained offline using dummy data. Any of a multiplicity of known classifying techniques can be used, such as nearest neighbors, support vector machines, and the like. The volume of interest, for example, may have a known surface properties, such a smooth, rounded, free of sudden transitions, or the like. The classifier operates on the current image from the buffer 14 to generate a probability that each voxel belongs to the background or the volume or organ of interest.

Figure 3:
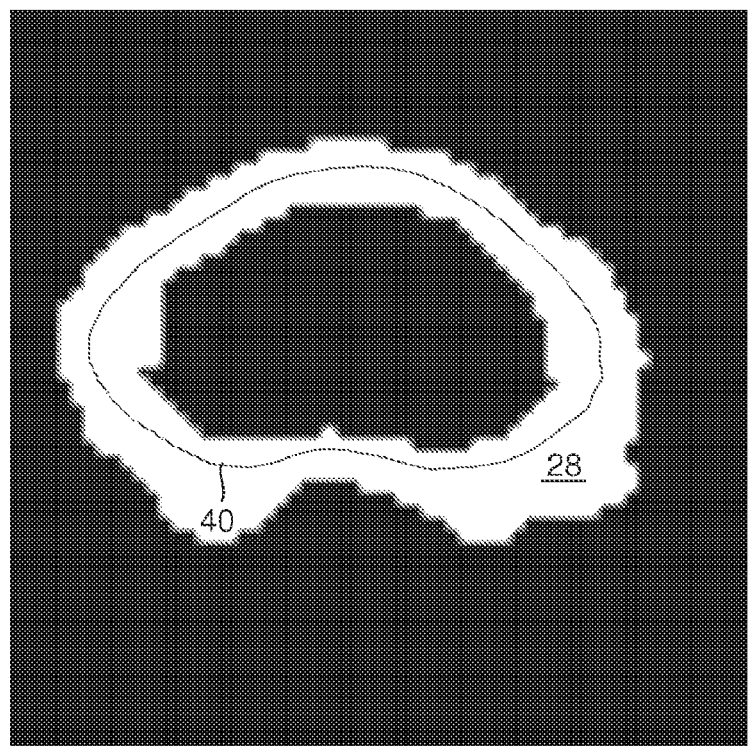
FIG. 3 is a map which depicts voxels which certainly belong to the brain stem, voxels which certainly belong to the background, and an area of uncertainty.

With reference to FIG. 3, to save processing time, the classification process may be performed only on voxels corresponding to the uncertainty region 28 of the transformed probability map. Without processing regions 24, 26 which have been determined by the probability mask as being definitely in the organ or volume of interest or the background. Optionally, a threshold circuit or processor can operate on the transformed probability map to identify the uncertainty region 28 by eliminating voxels with a certainty of zero or one which represent a 100% probability of being in the organ or volume of interest and a 100% probability of being in the background. Optionally, the threshold can be set lower such that classification is performed only on voxels which the probability map has determined has less than a 95%, for example, probability of being in the volume or organ of interest, or in the background.

A merge processor or computer routine 80 is programmed to merge, on a voxel by voxel basis, the probabilities determined by the classifier 70 and the probabilities from the transformed probability map 62. The merging, in one embodiment, averages the classification and probability map probabilities for each voxel. Other techniques for combining the probabilities are also contemplated. As one example, an operator control or first slider 82 may be provided to adjust the relative weighting of the classifier and probability map probabilities. A human operator can selectively adjust the relative weighting to adjust the threshold boundary. Based on the merged probabilities, the merge processor determines whether each voxel has a higher chance of being in the volume or organ of interest or in the background. A determined segment boundary is determined from the interface between the two regions and stored in an appropriate memory or buffer 84.

An image processor 90 is programmed to or includes a computer routine 92 which combines the current image from the memory or buffer 14 with the determined segmentation boundary 84 to create a segmented image. The image processor 90, optionally, is further programmed to or has a computer routine 94 which performs further image processing, such as colorization, smoothing, and the like, of the current image combined with the segmentation boundary, i.e., the segmented current image. The segmented current image is stored in a patient medical database 96 as part of the patient's medical record. A video processor 98 extracts selected slices, 3D volume representations, or the like from the segmented image 94 and displays them on a human-readable display 100, such as a video monitor.

In a semi-automated embodiment, a threshold circuit, processor, or computer routine 110 determines whether the probability for each voxel of the transformed probability map exceeds a threshold. For example, the threshold may be initially set as 0.5 in the above example, which indicates that the voxel is equally likely to be in the volume of interest and in the background. A processor or computer routine 112 defines the segmentation boundary based on the interface between the voxels which are more likely to be in the background and the voxels which are more likely to be in the volume or organ of interest. In this embodiment, the segmentation boundary 114 is supplied to the image processor routine 92 which combines the segmentation boundary with the current image. An operator viewing the segmented image on the display 100 uses a user input device 116 to adjust the threshold 110, in the present example to shift the 0.5 threshold higher towards one or lower towards zero. As the threshold is adjusted, the interface between the volume or organ of interest and the background shifts as does the segmentation boundary 114. In one embodiment, the operator moves a slider with a mouse to select higher and lower threshold values until the operator is satisfied with the segmentation displayed on the display 100. Once the segmentation is optimized by the operator, the optimized segmentation is stored in the patient medical database 96.

Once the image segmentation is complete, the segmented image has various applications. For example, the segmented image can be used in a radiation therapy system 120 to plan a radiation treatment protocol. Numerous other uses of the segmented images are, of course, contemplated.

In the foregoing discussion, it is to be understood that the various processors, computer routines, and steps can be performed by one or more computers or processors. A single processor can perform one or more of the computer processes or steps and any one or more of the computer routines or steps can be distributed among a plurality of computer processors. Similarly, memories, memory segments, and buffers described above can take form in a single large memory, distributed memories, or the like. Moreover, a computer program for controlling one or more processors to generate segmented images in accordance with the above description can be carried on a computer-readable medium, particularly a tangible medium, such as a CD or DVD, or other portable memory, a hard drive, resident computer memory, and the like. The program can also be carried by a non-tangible medium such as a digital or analog signal or the like.

Figure 4:
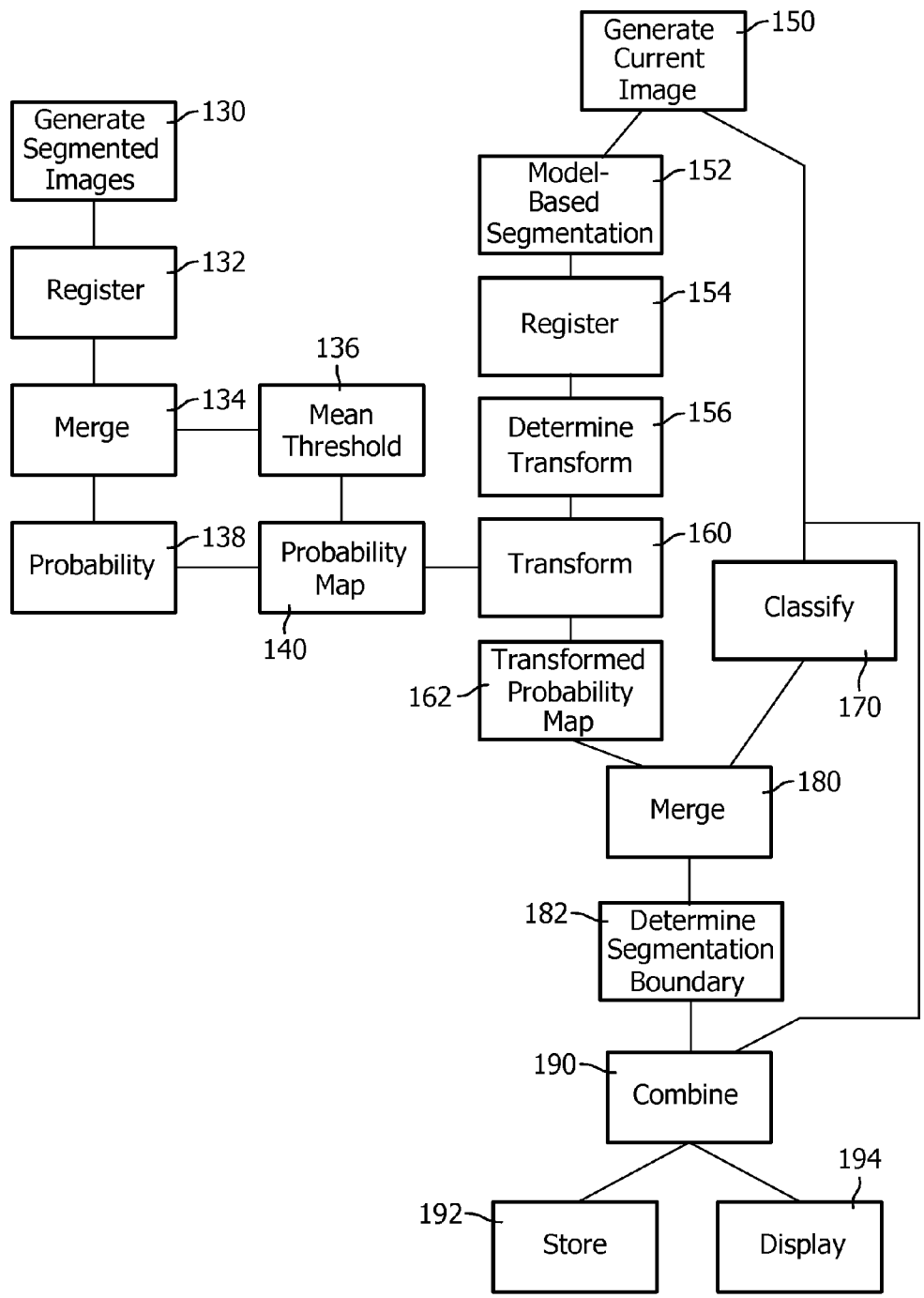
FIG. 4 is a flow chart which diagrammatically illustrates an automatic method of segmenting images; and, FIG. 5 is a flow chart which diagrammatically illustrates an operator assisted method of segmenting images.

With reference to FIG. 4, a plurality of images of a selected region of interest in each of a plurality of patients are generated and segmented at step 130. At step 132, the plurality of segmented images is registered. At step 134, the registered images are merged generating a composite image of the region of interest with a plurality of superimposed segmentation boundaries. A mean segmentation boundary is determined at step 136. A probability that each voxel is within the volume of interest or within the background is determined at a step 138. For example, all voxels which are inside of all of the superimposed segmentation boundaries are assigned to the volume of interest and all voxels which are outside of all of the superimposed segmentation boundaries are assigned to the background. Those voxels which are inside some of the segmentation boundaries and outside of others are assigned a probability in accordance with the relative percentage of the segmentation boundaries that the voxel is inside of or outside of. For example, all voxels which are within the volume of interest can be assigned the value of one, all voxels which are in the background can be assigned a value of zero, and all voxels that are inside of some of the superimposed segmentation boundaries and outside others are assigned a fractional value between zero and one based on the percentage of the superimposed segmentation boundaries that they are inside of or outside of. At step 140, the probabilities and the mean threshold boundary are combined to generate a probability map. The probability maps for each of a plurality of a volume of image can be stored in a library to be available for segmenting current images from a current patient.

When segmented images of a current patient are to be prepared, a plurality of current images are generated at step 150. At step 152, an organ model is retrieved from memory and at step 154, the organ model is fit to the current image. At step 156, the transform which brought the organ model into registration with the current image is determined. Various organ models are contemplated, such as a conventional organ model, the mean segmentation boundary, or the like.

At step 160, the probability map is transformed with the determined transform to generate a transformed probability map 162 which represents a probability that each voxel is in the volume of interest or in the background. In parallel in step 170, each voxel of the current image is classified based on image properties, such as intensity, gradient, texture, and the like, and assigned a probability based on the image properties that it belongs to the volume of interest or to the background.

At a step 180, the probabilities from the transformed probability map and the probabilities based on classification are merged on a voxel by voxel basis. At a step 182, a segmentation boundary for the region of interest in the current image is generated based on the merged probabilities. For example, all voxels that are in the volume of interest with a probability greater than a preselected or adjustable threshold are assigned to the volume of interest and those which are below the threshold are assigned to the background. The interface represents the segmentation boundary of the volume of interest. In the above example in which the volume of interest is assigned a value of one and the background a volume of zero, the threshold might be set for example at 0.5.

At a step 190, the segmentation boundary is combined with, e.g., superimposed on, the current image to generate a segmented current image. In a step 192, the segmented current image is stored in memory, for example, in a patient medical database. In a step 194, the segmented current image is displayed on a monitor or other clinician readable display.

Figure 5:
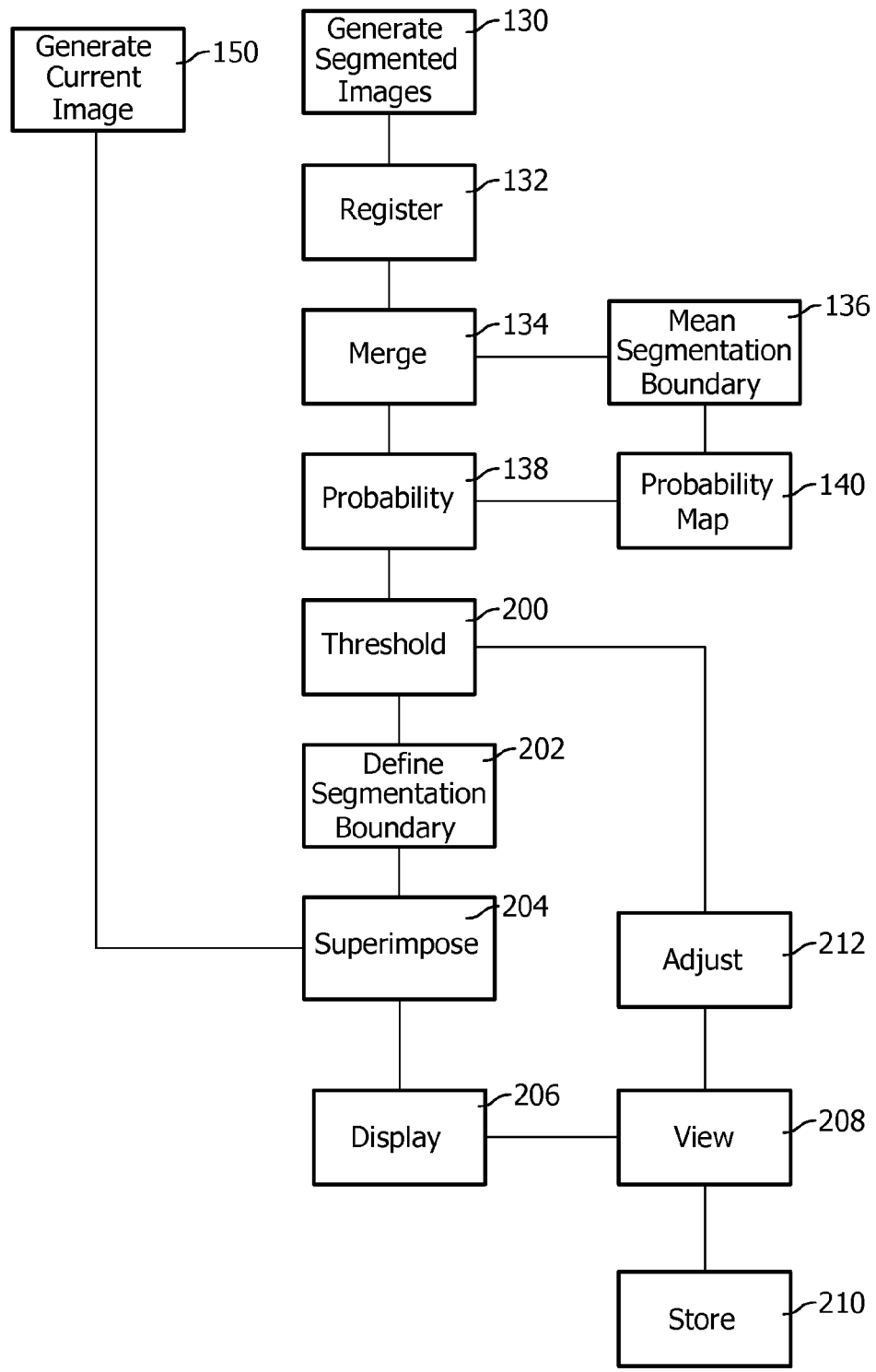

With reference to FIG. 5, in an operated assisted mode, the probability map is subject to a threshold segmented at a step 200. In the above example in which the volume of interest has a value of one and the background a value of zero, the threshold might be initially set, for example, at 0.5. At a step 202, the segmentation boundary is defined as the interface between the voxels which are more probably in the region of interest and the voxels which are more probably in the background, e.g., above or below 0.5. In step 204, the segmentation boundary is superimposed on the generated current image 150 to generate a segmented current image. At a step 206, the segmented current image is displayed to a radiologist or other technician. At a step 208, the radiologist or medical technician views the displayed segmented image and determines whether the segmentation is satisfactory. If the segmentation is satisfactory at a step 210, the segmented current image is stored, such as in a patient medical database. If the segmented image is not satisfactory, the radiologist or other medical technician adjusts the threshold at a step 212. When the threshold is adjusted, the segmentation boundary defining step 202 redefines the segmentation boundary, which redefine segmentation boundary is superimposed on the current image in the step 204 and displayed in step 206. This adjustment process continues iteratively until the radiologist or other medical technician is satisfied with the segmentation.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A system for segmenting current diagnostic images comprising:
one or more workstations which segment a volume of interest in previously generated diagnostic images of a selected volume of interest generated from a plurality of patients;
one or more processors programmed to:
register the segmented previously generated images, and
merge the segmented previously generated images into a probability map which depicts a probability that each voxel represents the volume of interest, a probability that each voxel represents background, and a mean segmentation boundary;
a segmentation processor which registers the probability map with a current diagnostic image of the volume of interest in a current patient to generate a transformed probability map, the segmentation processor being programmed to register the probability map with the current image by performing the steps of:
registering the mean segmentation boundary to the volume of interest of one of the current image and a model registered to the current image;
determining a transform by which the mean segmentation boundary was transformed to be registered to the current image or model;
transforming the probability map with the determined transform to generate the transformed probability map; and
a segmentation boundary processor which determines a segmentation boundary for the volume of interest based on the transformed probability map.

2. The system according to claim 1, further including:
a classifier which has been previously trained to classify diagnostic images of the volume of interest based on characteristics of the diagnostic image to determine a probability that at least selected voxels of the current image depict the volume of interest, and the background; and
a merge processor or computer routine which merges the probabilities from the classifier and the probabilities of the corresponding voxels from the transformed probability map as registered with the current image.

3. The system according to claim 2, further including:
a user input device by which a relative weighting with which of the classifier and probability map probabilities are merged.

4. The system according to claim 2, wherein the segmentation boundary processor further determines the segmentation boundary for the volume of interest in the current image based on the merged probabilities, and further including:
a processor or computer routine which combines the determined segmentation boundary with the current image.

5. The system according to claim 1, further including:
a thresholding device or processor which assigns voxels of the current image which, in the transformed probability map, have probabilities above a threshold value to one of the volume of interest and the background and if the voxels have probabilities below the threshold to the other of the volume of interest and the background.

6. The system according to claim 5, wherein the segmentation boundary processor further determines the segmentation boundary from an interface between the voxels assigned to the volume of interest and the voxels assigned to the background, and further including:
an image processor programmed to combine the segmentation boundary with the current image;
a display on which the segmented current image is displayed; and
an input device by which a user adjusts a probability threshold to adjust the segmentation boundary and adjust the segmentation of the displayed segmented current image.

7. The system according to claim 1, further including:
a medical database in which the segmented current image is stored; and
a radiation therapy planning system which uses the segmented current image to perform a radiation therapy planning process.

8. A system for segmenting current diagnostic images comprising:
one or more workstations which segment a volume of interest in previously generated diagnostic images of a selected volume of interest generated from a plurality of patients;
one or more processors programmed to:
register the segmented previously generated images, and
merge the segmented previously generated images into a probability map which depicts a probability that each voxel represents the volume of interest, a probability that each voxel represents background, and a mean segmentation boundary;
a segmentation processor which registers the probability map with a current diagnostic image of the volume of interest in a current patient to generate a transformed probability map, the segmentation processor being programmed to register the probability map with the current image by performing the steps of:
registering the mean segmentation boundary to the volume of interest of one of the current image and a model registered to the current image;
determining a transform by which mean segmentation boundary was transformed to be registered to the current image or model;
transforming the probability map with the determined transform to generate the transformed probability map; and
a segmentation boundary processor which determines a segmentation boundary for the volume of interest based on the transformed probability map;
wherein each of the previously segmented images has a segmented image boundary; and
wherein the probability that each voxel represents the volume of interest and the probability that each voxel represents the background is based on how many of the segmented image boundaries each voxel is inside of or outside of.

9. A method for segmenting diagnostic images comprising:
segmenting a volume of interest in prior diagnostic images of a selected volume of interest generated from a plurality of patients to define a plurality of segmentation boundaries;
registering the segmented prior images including the segmentation boundaries;

merging the registered segmented prior images into a probability map which depicts a probability that each voxel represents one of the volume of interest or background based on a distribution of the segmentation boundaries in the prior diagnostic image, and a mean segmentation boundary; and registering the probability map with a current diagnostic image of the volume of interest from a current patient to generate a transformed probability map.

10. The method according to claim 9, wherein registering the probability map to the current image includes:

registering the mean segmentation boundary to one of the volume of interest of the current image and a model registered to the current image;

determining a transform by which the mean segmentation boundary was transformed into registration with the current image; and transforming the probability map with the determined transform to generate the transformed probability map.

11. The method according to claim 9, further including:

classifying the current image of the volume of interest with a previously trained classifier routine based on characteristics of the current image to determine a probability that at least selected voxels of the current image depict the volume of interest, and the background; and merging the probabilities from the classifier routine and the probabilities from the transformed probability map as registered with the current image.

12. The method according to claim 11, further including:

determining a segmentation boundary for the volume of interest of the current image based on the merged probabilities; and combining the determined segmentation boundary with the current image.

13. The method according to claim 9, further including:

assigning voxels of the current image which have probabilities in the transformed probability map above a threshold to one of the volume of interest and the background and voxels below the threshold to the other of the volume of interest and the background;

determining the segmentation boundary from an interface between the voxels assigned to the volume of interest and the voxels assigned to the background;

combining the segmentation boundary with the current image to generate a segmented current image; and displaying the segmented current image.

14. The method according to claim 13, further including:

adjusting the threshold to adjust the segmentation boundary and adjust the segmentation of the displayed segmented current image.

15. The method according to claim 9, wherein merging the segmented prior image segmentation boundaries into the probability map includes:

assigning the voxels inside of the segmented image boundaries of all segmented images as representing the volume of interest;

assigning voxels outside the segmented image boundaries of all of the previously segmented images as background; and for each of the voxels inside some of the segmented image boundaries and outside others of the segmented image boundaries, assigning the probability based on a percentage of segmented image boundaries each voxel is inside of or outside of.

16. A non-transitory computer-readable medium carrying one or more computer programs for controlling one or more processors to perform a method comprising:

segmenting a volume of interest in prior diagnostic images of a selected volume of interest generated from a plurality of patients to define a plurality of segmentation boundaries;

registering the segmented prior images including the segmentation boundaries;

merging the registered segmented prior images into a probability map which depicts a probability that each voxel represents one of the volume of interest or background based on a distribution of the segmentation boundaries in the prior diagnostic image, and a mean segmentation boundary; and registering the probability map with a current diagnostic image of the volume of interest from a current patient to generate a transformed probability map.

17. A diagnostic imaging system comprising:

a diagnostic imaging scanner for generating current diagnostic imaging data;

a reconstruction processor for reconstructing the current diagnostic imaging data into a current image;

one or more processors programmed to perform a method comprising:

segmenting a volume of interest in prior diagnostic images of a selected volume of interest generated from a plurality of patients to define a plurality of segmentation boundaries;

registering the segmented prior images including the segmentation boundaries;

merging the registered segmented prior images into a probability map which depicts a probability that each voxel represents one of the volume of interest or background based on a distribution of the segmentation boundaries in the prior diagnostic image, and a mean segmentation boundary; and registering the probability map with a current diagnostic image of the volume of interest from a current patient to generate a transformed probability map; and a display device on which the segmented current image is displayed.

18. A system for segmenting current diagnostic images comprising:

one or more processors configured to:

register a probability map which depicts a probability that each voxel represents a volume of interest, a probability that each voxel represents background, and a mean segmentation boundary with a current diagnostic image of a volume of interest in a current patient to generate a transformed probability map, by performing the steps of:

registering the mean segmentation boundary to the volume of interest of one of the current diagnostic image and a model registered to the current image, determining a transform by which the mean segmentation boundary was transformed to be registered to the current image model, and transforming the probability map with the determined transform to generate a transformed probability map;

determine a segmentation boundary for the volume of interest in the current image based on the probabilities depicted by the probability map, at least one portion of the determined segmentation boundary being in the form of probability rather than a single discrete line;

combine the determined segmentation boundary with the current diagnostic image; and a display configured to display the segmented current diagnostic image in which the at least one portion is displayed in a range of gray scales based on the probability of representing the background or the volume of interest on either side of the mean segmentation boundary.

19. The system according to claim 18, further including:

one or more probability map processors for generating the probability map, the probability map processors being programmed to:

register a plurality of segmented previously generated images of the volume of interest in previously generated diagnostic images of the volume of interest generated from a plurality of other patients, and merge the segmented previously generated images to form the probability map.

20. The system according to claim 18, further including:

one or more probability map processors programmed to:

receive a plurality of previously segmented images which have each been segmented to define a previously segmented image boundary between the region of interest and the background;

determine a median or mean of the segmentation boundaries of the plurality of previously segmented images to define the mean segmentation boundary;

assign the voxels outside the segmented image boundaries of all of the previously segmented images as representing background;

assign the voxels inside the segmented image boundaries of all segmented images as representing the volume of interest;

for each of the voxels inside some of the segmented image boundaries and outside others of the segmented image boundaries, assigning the probability based on how many of segmented image boundaries each voxel is inside of or outside of.

* * * * *